A. SUNDH.
FLEXIBLE PIPING OR HOSE.
APPLICATION FILED OCT. 23, 1913.

1,179,575.

Patented Apr. 18, 1916.

WITNESSES:
Arthur Trizia Jr.
James G. Bethell

August Sundh
INVENTOR

BY
L. H. Campbell
ATTORNEY

UNITED STATES PATENT OFFICE.

AUGUST SUNDH, OF HASTINGS-UPON-HUDSON, NEW YORK.

FLEXIBLE PIPING OR HOSE.

1,179,575.  Specification of Letters Patent.  Patented Apr. 18, 1916.

Application filed October 23, 1913. Serial No. 796,785.

*To all whom it may concern:*

Be it known that I, AUGUST SUNDH, a citizen of the United States, residing in Hastings-upon-Hudson, in the county of Westchester and State of New York, have invented a new and useful Improvement in Flexible Piping or Hose, of which the following is a specification.

My invention relates to flexible metallic hose or piping employed for the transmission or conduction of fluids or other substances, such as water, steam, gas, air, or other substances; it may also be used to inclose electric wires or ropes or cables or other like bodies which need to be supported or protected; further my invention is usable for any other purposes to which it may be adapted.

I will proceed to disclose and claim my invention, in which—

Figure 1:
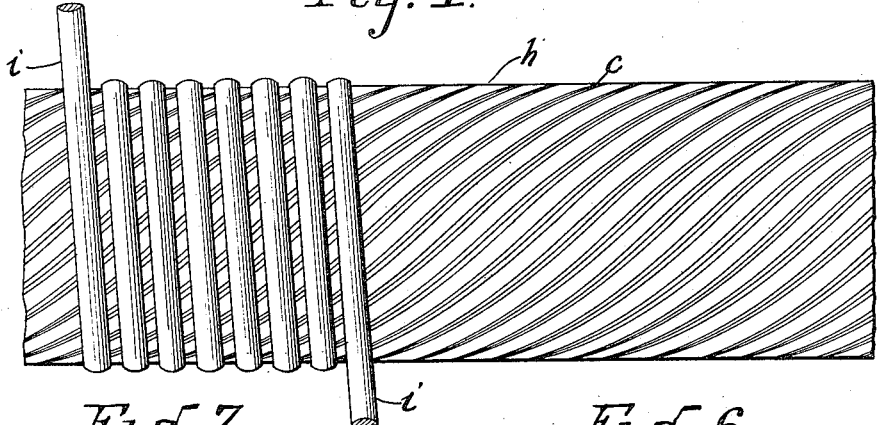
Figure 7:
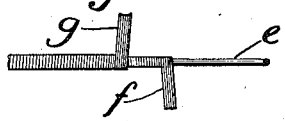
Figure 2:
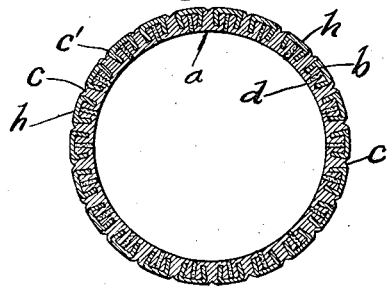
Figure 4:
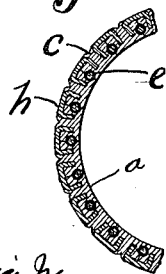
Figure 6:
Figure 3:
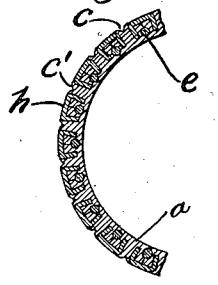
Figure 5:
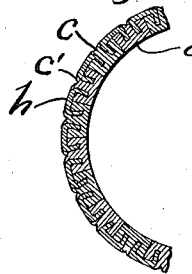

Figure 1 represents a portion of the hose or piping with an outside or encircling binding strip thereon; Fig. 2 is a cross sectional view of the hose or piping, showing one form thereof; Fig. 3 is a cross sectional view of a portion of the hose or piping, showing another modification thereof; Fig. 4 is a cross sectional view similar to that of Fig. 3, except with the addition of a covering around a tongue placed between the joints of the strips or coils forming the body of the hose; Fig. 5 is still another modification shown in cross section and similar to Fig. 2 except that the packing shown in Fig. 2 between the joints of the coils is omitted; Fig. 6 is a short length of round wire or small rod; Fig. 7 is a short length of round wire with superposed windings of wire thereon.

In the transmission of fluids in pipes or hose, or the carrying and supporting of other bodies therein, such for example, as those mentioned above, by way of illustration and not exclusive, it is desirable that the hose or piping shall be capable of being flexed or bent to adapt the same to fit the location or situation in which the hose or piping is to be placed; it is also desirable in a flexible hose that when the same is bent it shall remain leak proof in the case of the transmission of fluids and its interior surface shall be free of irregularities in order that the flow of the fluids shall be unobstructed; the feature of smooth surface is also desirable and highly useful in the case of the support or carrying therein of electric wires and in the case of cables or ropes or other bodies.

It is my object to produce a hose which shall have the qualities of being readily, easily and successfully flexed or bent as well as to be successfully usable for straight line work.

My invention is embodied in the following disclosed forms, among others, in which there are metal strips $a$ of suitable length and cross section for the purpose for which the hose is designed to be used, substantially in rectangular form in cross section, except that the edges may be slightly inclined; on the surface of these strips which is to be exposed as the outer surface of the tube, I form grooves $b$ therein substantially along the edges of the strips. These grooves or recesses are slightly inclined toward the edges of the strips. In the outer surface of the strips along about the middle of their length I form further grooves $c$. These strips are made up into a series of coils in a long pitch with their edges meeting to form the hose. Between the joints of the adjacent coils I may place a packing or a material suited to the purpose for which the pipe is to be used. In Fig. 2 I have shown this packing $d$ substantially of rectangular cross sectional area. In addition to the recesses in the strips forming the coils, of which I have already spoken, I may form recesses in their opposing edges, which recesses may be half round as I have shown in Fig. 3, or of any suitable cross sectional shape, and in which I have placed a tongue $e$ which serves to help to maintain the adjacent coils in proper place relatively to each other, and otherwise tend to perfect the hose. The tongue may be of any suitable material, varying in substance according to the purpose to which the hose shall be put.

In Fig. 6 I have indicated a short length of wire $e$ which may be used as a tongue in the half round grooves, Fig. 3; in Fig. 7 I have shown a short length of wire $e$ wound with another wire $f$ or wires, and still another winding of wires $g$ superposed on the first mentioned winding, which form of tongue may be used as indicated in Fig. 4, it always being kept in mind that the material of the tongue and the winding or covering thereon shall be of a material suitable not only for the purpose of the tongue, *per se*, but for the purpose of the hose as a whole and the uses to which the hose shall be put;

for example, instead of the wire, Figs. 6 and 7, being wound with other wire, the winding may be of asbestos; in still other cases it may be desired to use a packing comprising wire coated with copper or in still other cases merely old cordage or rope or any suitable material for packing; in still other instances soft metal can be used all of which however will serve in maintaining the forms of the coils.

The material of the coil strips and the binding or holding strips may be steel, copper or brass or alloy or any material which can be bent into coils. I bind the coils together by inserting the prongs of a double pronged strip $h$ in the recesses, the prongs following the inclination of the recesses and in that manner being firmly secured in the recesses against withdrawal. These binding holding strips serve effectually to lock together the coils, thereby obtaining strong structure, of smooth interior bore and constituting a leakless tubing, adapted to be flexed or bent as may be desired. In order to make assurance doubly sure against the withdrawal of the holding strips I force down the metal of the coil strips on either side of the groove $c$ against the shoulders of the binding strip, to form shoulders $c'$ against the corners of the binding strip $h$. Upon the tube as heretofore described and shown, I wind a metal wire or strip $i$ in coils of lesser pitch than the coils forming the body of the pipe, which coils of wire $i$ serve more firmly to retain the body of the hose and also serve as a protection for the same: of course it is not necessary that the coils $i$ shall always be of metal, as it is evident that other material might be used, dependent upon its suitability for the purpose in hand.

What I claim is:—

1. In a flexible metallic fluid tight tubing, the combination of a series of long pitch coils, forming the wall of the tubing, the coils having recesses, U-shaped binding strips engaging the recesses in the coils to bind the coils firmly together.

2. In a flexible metallic fluid tight tubing, the combination of a series of long pitch coils forming the wall of the tubing, the coils having recesses, U-shaped binding strips engaging the recesses in the coils to bind the coils firmly together, the coils being laid side by side to form a smooth inner wall of the tubing.

3. In a flexible metallic fluid tight tubing, the combination of a series of long pitch coils forming the wall of the tubing, the coils having recesses, U-shaped binding strips engaging the recesses in the coils to bind the coils firmly together, the coils being laid side by side to form a smooth inner wall of the tubing, and the recesses facing outward of the tubing and inclined inwardly to hold the binding strips against removal.

4. In a flexible metallic tubing, the combination of a series of long pitch coils, forming the wall of the tubing, the coils having recesses, U-shaped binding strips engaging the recesses in the coils to bind the coils firmly together, grooves in the strips and shoulders formed by the metal forced away from either side of the grooves to bear against the shoulders of the binding strips for additional security for holding the strip from working out.

5. In a flexible metallic fluid tight tubing, the combination of a series of long pitch coils, forming the wall of the pipe, the coils having recesses, U-shaped binding strips engaging the recesses in the coils to bind the coils firmly together, a binding strip of shorter pitch encircling the tubing for additional strength and serving also as a protective armor.

6. In a flexible metallic fluid tight tubing, the combination of a series of long pitch coils forming the wall of the tubing, the coils having recesses, U-shaped binding strips engaging the recesses in the coils to bind the coils firmly together, and a packing interposed in the joints of the coils.

7. In a flexible metallic tubing, the combination of a series of long pitch coils forming the wall of the tubing, the coils having recesses, U-shaped binding strips engaging the recesses in the coils to bind the coils firmly together, a packing interposed in the joints of the coils, and half round recesses in the joints of the coils with a correspondingly shaped tongue therein, serving to hold the coils in place relatively with each other.

8. In a flexible tubing, the combination of a series of long pitch coils, forming the wall of the tubing, recesses in the coils inclined toward the edges thereof, and U-shaped binding strips compressed into said recesses for locking the coils together.

9. In a flexible tubing, the combination of a series of long pitch coils forming the wall of the tubing, recesses on the outer periphery of each coil inclined toward the edges thereof, and U-shaped binding strips forced into said recesses for locking the coils and strips together.

10. In a flexible tubing, the combination of a series of long pitch coils forming the wall of the tubing, recesses on the outer periphery of each coil inclined toward the edges thereof, U-shaped binding strips forced into said recesses for binding the coils together, and shoulders formed on each coil between the binding strips, said shoulders being upset so as to retain the strips against displacement.

11. In a flexible tubing, the combination of a series of long pitch coils forming the wall of the tubing, recesses on the outer periphery of each coil inclined toward the edges thereof, packing between adjacent coils, and U-shaped binding strips forced into said recesses for locking said strips, coils and packing together.

12. In a flexible tubing, the combination of a series of long pitch coils forming the wall of the tubing, recesses in the coils inclined toward the edges thereof, and binding strips of substantially rectangular cross section forced into said recesses, the parallel sides of the strips being thereby bent toward each other so as to form a lock joint for the coils.

13. In a flexible metallic tubing, the combination of a series of coils forming the wall of the tubing, the coils having recesses, U-shaped binding strips engaging the recesses in the coils and binding the coils together longitudinally, said coils and binding strips being laid in a long pitch corresponding to a desired flexibility of the tubing, the whole structure forming a fluid tight tubing at all times.

14. In flexible metallic tubing, the combination of a series of coils forming the wall of the tubing, the coils having recesses, U-shaped binding strips engaging the recesses in the coils and binding the coils together, said coils and U-shaped binding strips being laid in a long pitch, whereby a uniform sliding is obtained between each of the series of the coils and the binding strips when the tube is bent in various directions to maintain the tubing fluid tight at all times.

15. In flexible metallic tubing, the combination of a series of coils forming the wall of the tubing, each of the coils having two recesses, U-shaped binding strips engaging the recesses in the coils and binding the coils together, said coils and U-shaped binding strips being laid in a pitch of a length to obtain a uniform sliding action between each of the series of coils and between each of the U-shaped binding strips and the recesses of the coils when the pipe is bent in any direction, to maintain the tubing fluid tight at all times.

16. A flexible metallic tubing in which the wall of the tubing is composed of a series of coils bound together with a series of binding strips to obtain a flexibility depending on the longitudinal sliding motion between each of the series of coils and each of the series of binding strips and coils, whereby an internal pressure maintains the tubing fluid tight at all times, the coils being laid in a long pitch and the binding strip for the coils being laid in a long pitch, said coils having longitudinal recesses and the said strips being U-shaped and formed to fit in the grooves of the coils.

17. In flexible metallic tubing adapted for internal pressure, the combination of a series of coils laid side by side in a long pitch, and a series of U-shaped binding strips for holding said coils together, whereby the internal pressure expands and maintains the wall of the tubing liquid-tight at all times, and whereby a longitudinal sliding motion takes place between each of the series of coils and each of the series of binding strips and coils when the tubing is bent in various directions but still maintaining the tubing fluid tight.

18. In flexible metallic tubing adapted for internal pressure, the combination of a series of coils forming the wall of the tubing, the coils having longitudinal recesses, U-shaped binding strips engaging said longitudinal recesses in the coils and binding the coils together, whereby the internal pressure will expand the pipe and coöperate to make it leak-proof at all times, said coils and binding strips being laid in a suitable long pitch for obtaining suitable sliding between each of the coils and binding strips, and thereby obtain suitable flexibility of the tubing when the same is bent in various directions and still maintaining the tubing fluid tight.

In testimony whereof, I have signed my name to this specification in the presence of two subscribing witnesses.

AUGUST SUNDH.

Witnesses:
JAMES G. BETHELL,
WALTER C. STRANG.